(12) United States Patent
Khawer et al.

(10) Patent No.: US 8,737,417 B2
(45) Date of Patent: May 27, 2014

(54) LOCK-LESS AND ZERO COPY MESSAGING SCHEME FOR TELECOMMUNICATION NETWORK APPLICATIONS

(75) Inventors: Mohammad R. Khawer, Lake Hopatcong, NJ (US); Lina So, East Brunswick, NJ (US)

(73) Assignee: Alcatel Lucent, Paris (FR)

( * ) Notice: Subject to any disclaimer, the term of this patent is extended or adjusted under 35 U.S.C. 154(b) by 623 days.

(21) Appl. No.: 12/945,146

(22) Filed: Nov. 12, 2010

(65) Prior Publication Data
US 2012/0120965 A1 May 17, 2012

(51) Int. Cl.
*H04L 12/54* (2013.01)

(52) U.S. Cl.
USPC ............ 370/428; 370/429; 711/153; 711/159

(58) Field of Classification Search
USPC ............................ 370/428, 429; 711/153, 159
See application file for complete search history.

(56) References Cited

U.S. PATENT DOCUMENTS

| | | | |
|---|---|---|---|
| 5,408,464 A | 4/1995 | Jurkevich | |
| 5,913,230 A | 6/1999 | Richardson | |
| 6,115,748 A | 9/2000 | Hauser et al. | |
| 6,735,620 B1 | 5/2004 | Blackmore et al. | |
| 6,799,200 B1 | 9/2004 | Blackmore et al. | |
| 6,999,432 B2 | 2/2006 | Zhang et al. | |
| 7,003,042 B2 | 2/2006 | Morelos-Zaragoza et al. | |
| 7,089,289 B1 | 8/2006 | Blackmore et al. | |
| 7,093,013 B1 | 8/2006 | Hornok, Jr. et al. | |
| 7,096,034 B2 | 8/2006 | Zhang et al. | |
| 7,180,866 B1 | 2/2007 | Chartre et al. | |
| 7,206,966 B2 | 4/2007 | Barr et al. | |
| 7,254,812 B1 | 8/2007 | Menezes | |
| 7,352,693 B2 | 4/2008 | Seid et al. | |
| 7,451,456 B2 * | 11/2008 | Andjelic | ...................... 719/321 |
| 7,571,440 B2 | 8/2009 | Vessey et al. | |
| 7,590,050 B2 | 9/2009 | Foltak | |
| 7,603,256 B2 | 10/2009 | Cheng et al. | |
| 7,609,652 B2 | 10/2009 | Kellerer et al. | |

(Continued)

FOREIGN PATENT DOCUMENTS

| | | |
|---|---|---|
| EP | 1 788 491 | 5/2007 |
| TW | 200813739 | 3/2008 |

(Continued)

OTHER PUBLICATIONS

Freescale Semiconductor; QorIQ ™ P4080 Communications Processor Product Brief; Sep. 2008; Freescale Semiconductor, Inc.; Rev. 1; pp. 2-5, 14-15, 19-22, 28-29.

(Continued)

*Primary Examiner* — Christopher Grey
(74) *Attorney, Agent, or Firm* — Fay Sharpe LLP

(57) ABSTRACT

A computer-implemented system and method for a lock-less, zero data copy messaging mechanism in a multi-core processor for use on a modem in a telecommunications network are described herein. The method includes, for each of a plurality of processing cores, acquiring a kernel to user-space (K-U) mapped buffer and corresponding buffer descriptor, inserting a data packet into the buffer; and inserting the buffer descriptor into a circular buffer. The method further includes creating a frame descriptor containing the K-U mapped buffer pointer, inserting the frame descriptor onto a frame queue specified by a dynamic PCD rule mapping IP addresses to frame queues, and creating a buffer descriptor from the frame descriptor.

24 Claims, 6 Drawing Sheets

(56) References Cited

U.S. PATENT DOCUMENTS

| | | |
|---|---|---|
| 7,620,753 B1 | 11/2009 | Beaman et al. |
| 7,656,815 B2 | 2/2010 | Kellerer et al. |
| 7,668,191 B2 | 2/2010 | Steinback et al. |
| 7,831,710 B2 | 11/2010 | Ing et al. |
| 7,873,964 B2 | 1/2011 | Huang et al. |
| 7,933,197 B2 | 4/2011 | Bryant et al. |
| 7,953,915 B2 | 5/2011 | Ge et al. |
| 8,024,417 B2 | 9/2011 | Mehrotra |
| 8,059,532 B2 | 11/2011 | Riddle et al. |
| 8,072,879 B2 | 12/2011 | Vasseur et al. |
| 8,099,546 B2 | 1/2012 | Rostedt |
| 8,271,996 B1 | 9/2012 | Gould et al. |
| 8,504,744 B2 | 8/2013 | Khawer et al. |
| 2002/0087710 A1 | 7/2002 | Aiken et al. |
| 2003/0188233 A1 | 10/2003 | Lubbers et al. |
| 2004/0062246 A1 | 4/2004 | Boucher et al. |
| 2004/0081080 A1 | 4/2004 | Ji et al. |
| 2004/0187117 A1 | 9/2004 | Orion et al. |
| 2005/0008011 A1 | 1/2005 | Georgiou et al. |
| 2005/0111389 A1 | 5/2005 | Dick et al. |
| 2006/0003792 A1 | 1/2006 | Gholmieh et al. |
| 2006/0041737 A1 | 2/2006 | Kumagai |
| 2006/0046819 A1 | 3/2006 | Nguyen et al. |
| 2007/0010281 A1 | 1/2007 | Sebire |
| 2007/0104204 A1 | 5/2007 | Brokenshire et al. |
| 2007/0195723 A1 | 8/2007 | Attar et al. |
| 2007/0220294 A1 | 9/2007 | Lippett |
| 2008/0002681 A1 | 1/2008 | Bajic et al. |
| 2008/0002702 A1 | 1/2008 | Bajic et al. |
| 2008/0107014 A1 | 5/2008 | Huang et al. |
| 2008/0276056 A1* | 11/2008 | Giacomoni et al. .......... 711/159 |
| 2009/0055826 A1 | 2/2009 | Bernstein et al. |
| 2009/0080369 A1 | 3/2009 | Uminski et al. |
| 2009/0097397 A1 | 4/2009 | Moreira Sa de Souza |
| 2009/0122756 A1 | 5/2009 | Gu et al. |
| 2009/0207726 A1 | 8/2009 | Thomson et al. |
| 2009/0228890 A1 | 9/2009 | Vaitovirta et al. |
| 2009/0248934 A1 | 10/2009 | Ge et al. |
| 2010/0008218 A1 | 1/2010 | Dumov et al. |
| 2010/0014459 A1 | 1/2010 | Mir et al. |
| 2010/0029266 A1 | 2/2010 | Van Gassel et al. |
| 2010/0080116 A1 | 4/2010 | Agashe et al. |
| 2010/0121975 A1 | 5/2010 | Sinha et al. |
| 2010/0157814 A1 | 6/2010 | Ha et al. |
| 2010/0184432 A1 | 7/2010 | Yano et al. |
| 2010/0278038 A1 | 11/2010 | Stahle et al. |
| 2010/0295859 A1 | 11/2010 | Stauffer et al. |
| 2010/0296428 A1 | 11/2010 | Ho |
| 2010/0315561 A1 | 12/2010 | Cooper et al. |
| 2010/0318996 A1 | 12/2010 | Harris et al. |
| 2010/0322067 A1 | 12/2010 | Tenny |
| 2010/0322250 A1 | 12/2010 | Shetty et al. |
| 2010/0331056 A1 | 12/2010 | Nasrabadi et al. |
| 2011/0044165 A1 | 2/2011 | Ni et al. |
| 2011/0069650 A1 | 3/2011 | Harkirat et al. |
| 2011/0093733 A1 | 4/2011 | Kruglick |
| 2011/0122884 A1 | 5/2011 | Tsirkin |
| 2011/0138387 A1 | 6/2011 | Ahn et al. |
| 2011/0292824 A1 | 12/2011 | Uemura et al. |
| 2012/0028636 A1 | 2/2012 | Khawer et al. |
| 2012/0069728 A1 | 3/2012 | Jung et al. |
| 2012/0079290 A1 | 3/2012 | Kumar et al. |
| 2012/0093047 A1 | 4/2012 | Khawer et al. |
| 2012/0110223 A1 | 5/2012 | Khawer et al. |
| 2012/0131376 A1 | 5/2012 | Khawer et al. |
| 2012/0134320 A1 | 5/2012 | Khawer et al. |
| 2012/0155398 A1 | 6/2012 | Oyman et al. |
| 2012/0207011 A1 | 8/2012 | Franklin et al. |
| 2013/0017854 A1 | 1/2013 | Khawer |
| 2013/0061231 A1 | 3/2013 | Zhang et al. |
| 2013/0117305 A1 | 5/2013 | Varakin et al. |

FOREIGN PATENT DOCUMENTS

| | | |
|---|---|---|
| TW | 201006184 | 2/2010 |
| WO | WO 01/63416 | 8/2001 |
| WO | WO 02/07464 | 1/2002 |
| WO | WO 2005/098623 | 10/2005 |
| WO | WO 2008/005793 | 1/2008 |

OTHER PUBLICATIONS

RapidIO Trade Association; RapidIO ™ Interconnect Specification; Jun. 2002; RapidIO ™ Trade Association; Rev. 1.2; p. ll-10.

Siu, Sam, "An Introduction to the QorIQ ™ Data Path Acceleration Architecture (DPAA)"; Jun. 23, 2010; Freescale Semiconductor, Inc; FTF-NET-F0444; pp. 1-21.

Wang, Shrek ; An Introduction to the QorIQ ™ Data Path Acceleration Architecture (DPAA); Aug. 2009; Freescale Technology Forum; 1-12.

"Emerson Network Power AMC-9210 AdvancedMC Module Preliminary Data Sheet", Jun. 1, 2008, pp. 1-3, http://www.powerbridge.de/download/dat.

International Search Report dated Jan. 12, 2012.

Palaniappan, Sathish K., et al., "Efficient data transfer through zero copy", IBM Corporation, Sep. 2008.

International Search Report dated Oct. 24, 2012.

Freescale Semiconductor; QorIQ ™ P4080 Communications Processor Product Brief; Sep. 2008; Freescale Semiconductor, P4080PB; Rev. 1, p. 1-33.

Taiwan IPO Search Report dated Nov. 27, 2013.

Taiwan Search Report (with English Translation) dated Jan. 16, 2014 (from related U.S. Appl. No. 12/847,414).

US 6,014,703, 01/2000, McCrory et al. (withdrawn)

* cited by examiner

LOCK-LESS AND ZERO COPY MESSAGING SCHEME FOR TELECOMMUNICATION NETWORK APPLICATIONS

BACKGROUND OF THE INVENTION

The exemplary embodiments of the invention relate to a zero-copy, lock-less, and non-blocking messaging scheme for multi-cell support on a single modem board using a multi-core processor. While the invention is particularly directed to the art of wireless telecommunications, and will be thus described with specific reference thereto, it will be appreciated that the invention may have usefulness in other fields and applications.

By way of background, LTE (Long Term Evolution) is a rapidly evolving 3GPP project that aims to improve the UMTS (Universal Mobile Telecommunications System) mobile phone standard to cope with future communication network demands. LTE improves wireless network efficiency and bandwidth, lowers costs and enhances service experience. Specifically, LTE makes use of new spectrum opportunities and offers better integration with other open standards. LTE generally includes an LTE RAN (Radio Access Network) (also known as E-UTRAN) along with an EPS (Evolved Packet System, also called Evolved Packet Core).

Communication systems are generally split into two primary functions: data plane functions and control plane functions. In previous LTE products, at least two processors were used on the modem board: one to support the control plane functions (non-real time, e.g., Operations, Administration, and Management (or OA&M), and call processing management-related functionalities), and another to terminate and support the data plane functions (real time, e.g., LTE Layer 2 processing). Both the control and data planes use different operating system (OS) instances, such as Linux for the control plane and a real-time OS such as vXWorks (made and sold by Wind River Systems of Alameda, Calif.) for the data plane core. Typically, one modem board supports one sector or cell. So to support multi-cell (e.g., 3-cells or 6-cells) configurations, it would be necessary to provide as many modem boards as the number of cells.

A multi-core processor may be used in an LTE wireless base station on a modem board. An operating system such as SMP Linux with a PREEMPT RT patch may run on one SMP partition containing all eight cores. In this configuration the control plane (non-real time threads/processes) and the data plane (real time threads/processes) share the same operating system instances even though they are bound to run on different cores. The use of the Linux protocol stack to send/receive TCP/UDP packets from the real time processes/threads, such as the LTE L2 scheduler running on the data plane core, may result in unbounded latency spikes that may break down the processing of the LTE L2 scheduler. This is due to the fact that the Linux protocol stack is not designed to be lock-less, and since it is also used by the non real time processes/threads such as OAM, and CALLP running on the control plane core.

In an SMP environment, a lock taken by a non-real-time process or thread on one core (such as found on the control plane) may cause a latency spike for a real time thread or process waiting for that lock to be released on a different core (such as found on the data plane). Thus, there is a need for a lock-less, zero copy, non-blocking messaging scheme that does not use the Linux Protocol stack for the fast data path on the data plane core to meet the performance needs of a multi-core processor-based modem board that uses one partition. Without such a scheme the system may be subject to unbounded latency spikes that could break down the entire system, especially with respect to the processing of the LTE L2 scheduler.

SUMMARY OF THE INVENTION

In one aspect of the exemplary embodiment, a computer-implemented method for lock-less, zero data copy messaging in a multi-core processor is provided. The method includes, for each of a plurality of processing cores, acquiring a kernel to user-space (K-U) mapped buffer and corresponding buffer descriptor, inserting a data packet into the buffer; and inserting the buffer descriptor into a circular buffer.

In another aspect, an apparatus for providing lock-less, zero copy access to buffers between user-space processes and kernel space processes is provided. The apparatus includes a modem board, and a multi-core processor having a plurality of processor cores attached to the modem board. The modem board includes kernel space, user space, and a circular buffer for each processor core adapted to store kernel space to user space (K-U) mapped buffer descriptors.

In yet another aspect, a non-transitory computer-usable data carrier is provided that stores instructions which cause a computer to, for each of a plurality of processing cores, acquire a circular buffer for storing buffer descriptors. The buffer descriptors stored in the circular buffer contain information about buffers that are kernel space to user space (K-U) mapped. The instructions also cause the computer to perform the following using one or more kernel space threads in conjunction with one or more hardware components: receive a data packet at an ethernet interface, acquire a K-U mapped buffer and corresponding pointer, insert the received data packet into the K-U mapped buffer, en-queue a frame descriptor comprising of the K-U mapped buffer pointer containing the data packet into a frame queue, and after the data packet arrives at the front of the frame queue, generate an interrupt signal invoking a process that creates a buffer descriptor from the frame descriptor. The buffer descriptor associated with the data packet is then inserted into the specified circular buffer as per a frame queue to circular buffer mapping.

Further scope of the applicability of the present exemplary embodiment will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
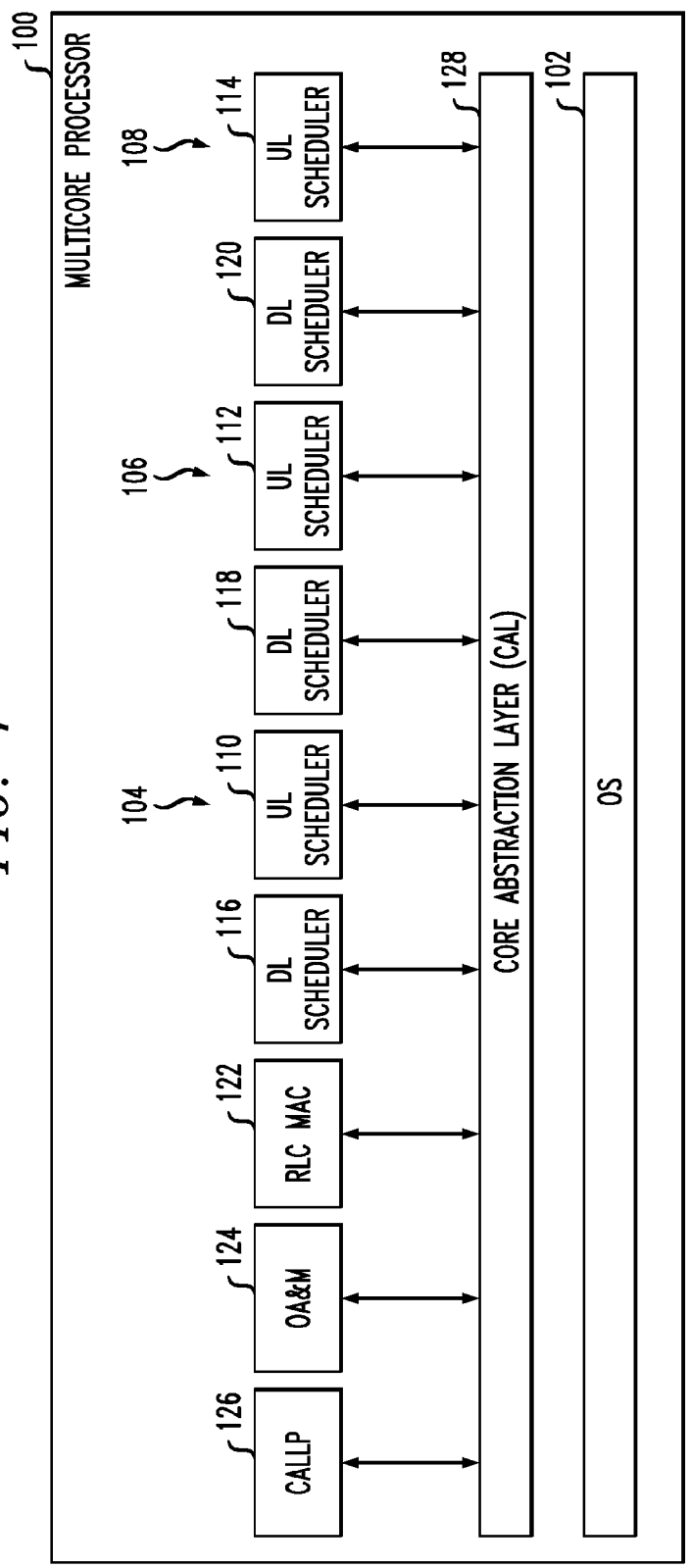
FIG. 1 illustrates one embodiment of a platform architecture in accordance with aspects of the present invention.

Referring now to the drawings wherein the showings are for purposes of illustrating the exemplary embodiments only and not for purposes of limiting the claimed subject matter, FIG. 1 provides a view of a system into which the presently described embodiments may be incorporated.

With reference now to FIG. 1, an exemplary platform architecture 100 is shown. This architecture is generally used on a modem board, but it is to be understood that it may be used in other applications. In this embodiment one partition is defined with all eight cores in it. It is to be appreciated, however, that the multi-core processor 100 may have any number of cores. With this embodiment, it is thus possible to use a single symmetric multiprocessing (SMP) operating system (OS) instance 102 that runs on all of the cores (e.g., eight cores). Since the control and data planes are under one OS instance, care is generally needed to ensure that a problem with the data plane will not bring down the control plane as well.

In this example, the multi-core processor 100 serves three cells (shown as 104, 106, and 108 in the figure). Each cell requires an uplink (UL) scheduler (shown as 110, 112, and 114 in the figure) and a downlink (DL) scheduler (shown as 116, 118, and 120 in FIG. 1).

It is known that the Radio Link Control (RLC) layer is used to segment, concatenate and correct errors on packet frames sent and received across the LTE air interface. The Radio Link Control and Medium Access Control (RLC/MAC) software is used in the GPRS (2.5G) wireless stack. It provides acknowledged and unacknowledged data transfer between the mobile station and the base station controller (BSC). Thus, also included is an RLC/MAC block 122, which is the basic transport unit on the air interface that is used between the mobile and the network. The RLC/MAC block 122 is used to carry data and RLC/MAC signaling.

The multi-core processor 100 also provides Operations, Administration, and Management (OA&M) 124 and a CALLLP module 126 that provides non real time call management related services.

In addition, the multi-core processor 100 includes a core abstraction layer (CAL) 128, which hides the core specific details from the Layer 2 (L2) application software. Layer 2 is the Data Link Layer of the seven-layer OSI model of computer networking. The Data Link Layer is the protocol layer that transfers data between adjacent network nodes in a wide area network or between nodes on the same local area network segment. The Data Link Layer provides the functional and procedural means to transfer data between network entities and might provide the means to detect and possibly correct errors that may occur in the Physical Layer. Examples of data link protocols are Ethernet for local area networks (multi-node), the Point-to-Point Protocol (PPP), HDLC and ADCCP for point-to-point (dual-node) connections. In this case, L2 generally refers to the L2 scheduler processing that is needed for the LTE air interface, which has very tight real time requirements.

To meet the real time performance needs of the base station, which is responsible for handling traffic and signaling between a mobile communication device and the network switching subsystem, an OS such as SMP Linux with PREEMPT_RT patch may be used. Of course, it is to be understood that other operating systems may be used. An open source OS such as SMP Linux with Preempt_RT is chosen over a hard core real time OS such as vxWorks since vxWorks has very high licensing fees for its usage. To achieve deterministic behavior in such an SMP configuration, the system is preferably implemented in a manner that employs core reservation and core affinity constructs to achieve an AMP-like system behavior. This is also desirable to get the best performance out of SMP Linux with PREEMPT_RT OS, for example. Use of lockless zero copy services, such as buffer management, and messaging services may also help address any latency issues that may be posed by the use of SMP Linux with PREEMPT_RT OS.

One of the main functions of the core abstraction layer (128) as shown in FIG. 1 is to provide high-level applications, such as L2 processing, with various services that utilize the full capabilities of the multi-core platform. The core abstraction layer is thus designed to achieve several goals. First, it should support a BED (Backplane Ethernet Driver) DPAA-Based Interface, while hiding DPAA and multi-core specific implementation from higher-level application software (i.e., L2 software). Second, it should utilize the P4080's DPAA hardware components to provide an accelerated data path for user-plane data in both the ingress and egress directions. Third, it should provide as much flexibility as possible so to easily adapt to configuration changes (i.e., without requiring code changes). An example of a CAL configuration is a DPAA resources configuration for buffer pools, ingress frame queues, and egress frame queues.

To summarize, an implementation of the present invention uses all of the processor cores in one partition. This will require the use of only one OS instance, and no need to use a hypervisor. Since it may be difficult for simple Linux to meet all of the hard real-time processing needs, an OS such as SMP Linux with PREEMPT_RT patch is preferred. An open source OS is also used to reduce the cost. The system further incorporates core affinity and CPU reservation capabilities of SMP Linux to define an AMP like system behavior within the SMP configuration, which permits 6-cell or even 9-cell configurations. Because the OS instance is shared between non-real time cores (such as the control plane) and real time cores (such as the data planes), problems arise when a lock is taken by a non-real time thread/process which causes a delay for a real time thread/process since the real time thread/process has to wait for the release of the lock for the data plane core(s). Since the standard Linux protocol stack does not guarantee a lock-less implementation, this invention defines a lock-less messaging scheme for a real time process (LTE L2 scheduler) running on data plane cores, to send/receive TCP/UDP IP packets while avoiding the use of the protocol stack. The non-real time process such as OA&M running on control plane core will continue to use the Linux protocol stack for its normal operation. Due to Linux GPL issues, our proprietary LTE L2 scheduler is operated in user space. So to send and receive TCP/UDP IP data from the LTE L2 scheduler, data has to cross the user-kernel space boundary that typically requires a data copy. Thus, consuming processor power to copy data from one memory location to another wastes precious resources. Accordingly, it is desirable to provide a method and system that allows for an efficient lock-less, zero copy and non blocking messaging service for the real time threads/processes running on the data plane cores while allowing the control plane to operate in its normal manner (such as by using the traditional Linux protocol stack).

Figure 2:
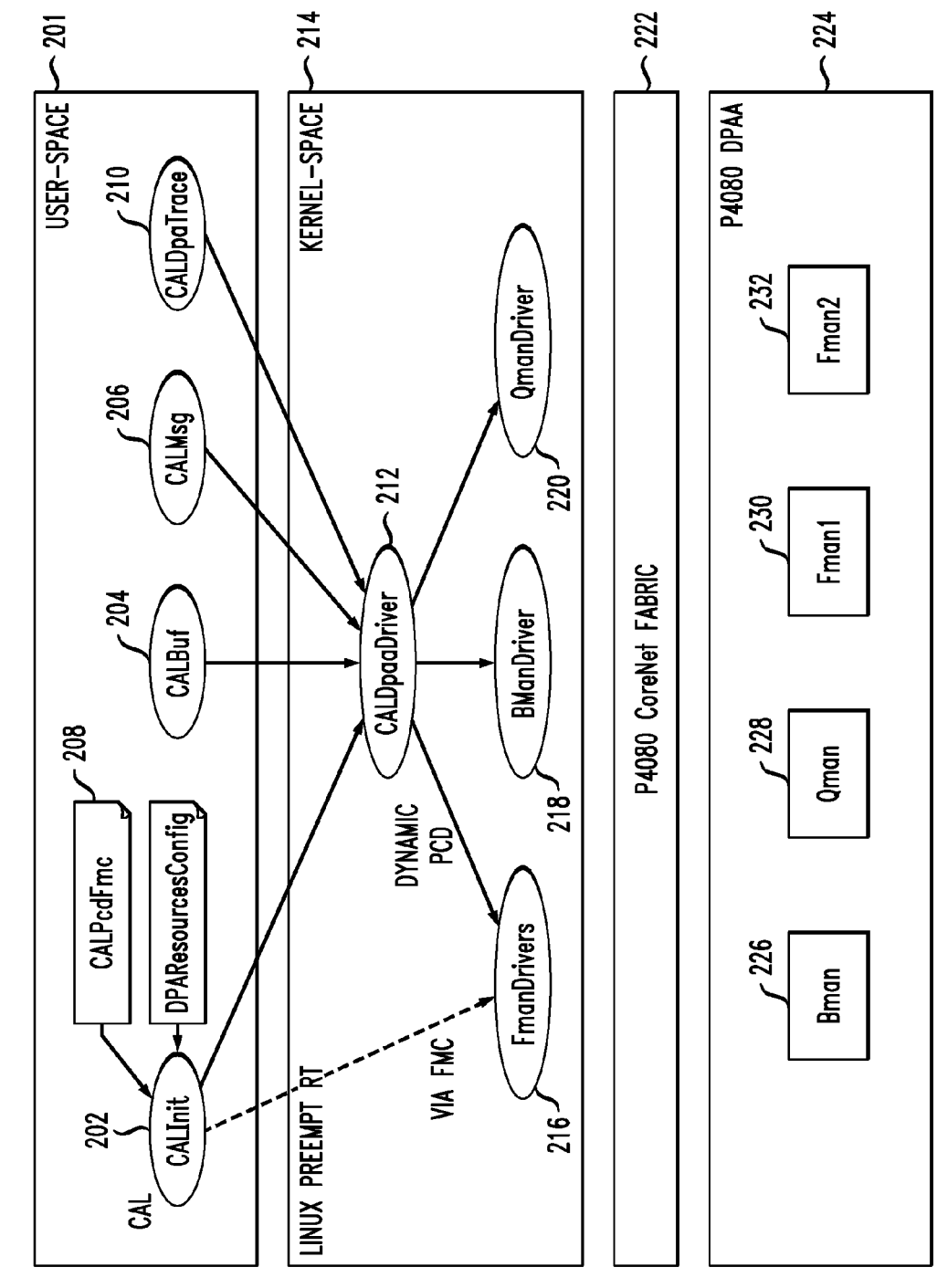
FIG. 2 illustrates an exemplary architecture for implementing the core abstraction layer shown in FIG. 1.

With reference now to FIG. 2, an exemplary architecture 200 that achieves these and other goals is shown. It is known that a conventional computer operating system usually segregates virtual memory into kernel space and user space. Kernel space is strictly reserved for running the kernel, kernel extensions, and most device drivers. In contrast, user space is the memory area where all user mode applications work and this memory can be swapped out when necessary. In this regard, a core abstraction layer (CAL) 201 includes various modules in user space, including, but not limited to: a core abstraction layer initialization (CALInit) module 202 that loads the LTE network configuration and any static PCD rules to the frame managers (FMAN) 230 and 232 and sets up the CAL framework based on a set of configuration files, a core abstraction layer buffer (CALBuf) module 204, a core abstraction layer messaging (CALMsg) module 206 that provides messaging services to L2 software to send and receive user-plane data to or from another board (i.e., eCCM) without the use of the Linux protocol stack, a core abstraction layer parsing, classifying and distributing (CALPcdFmc) module 208 that provides Parsing, Classification and Distribution (PDC) rules and configurations to be used by each FMAN (230, 232) for routing ingress frames to appropriate cores, and a core abstraction layer DPAA trace (CALDpaaTrace) module 210 that provides tracing capabilities for enabling and disabling traces in the core abstraction layer DPAA driver (CALDPAADriver) 212, which is a kernel space module.

The architecture 200 further includes a suitable operating system 214 such as SMP Linux with Preempt RT patch. The operating system 214, in turn, supports various drivers, such as the aforementioned CALDPAADriver 212, at least one frame manager (FMAN) driver 216, at least one buffer manager (BMAN) driver 218, and at least one queue manager (OMAN) driver 220.

As shown in FIG. 2, the architecture 200 may suitably include a P4080 CoreNet fabric 222, which is an interconnect architecture suitable for scalable on-chip network to connect multiple power architecture processing cores with caches, stand-alone caches and memory subsystems.

The P4080 processor includes an implementation of the new Data Path Acceleration Architecture (DPAA). Thus, the architecture 200 may further include a P4080 DPAA 224. The DPAA 224 is designed to optimize multicore network processing such as load spreading and sharing of resources, including network interfaces and hardware accelerators. As shown, the DPAA 224 generally includes various managers such as a BMAN 226, a QMAN 228, and a first and second FMAN 230 and 232, respectively.

The CALInit module 202 typically loads the LTE network configuration and any static PCD rules to the frame managers 230 and 232 and sets up the CAL framework based on a set of configuration files. The CALInit module 202 interfaces with an FMC (FMan Configuration Tool) (not shown) or any number of FMan API(s) (not shown) to configure the FMan PCD, and the CALDPAADriver 212 to load and setup the CAL configuration (e.g., user plane DPA resources).

The CALPcdFmc module 208 provides Parsing, Classification and Distribution (PDC) rules and configurations to be used by each FMan (230, 232) for routing ingress frames to appropriate cores.

The CALInit module 202 is responsible for providing various functionalities. For the master core at startup, the CALInit module 202 sets up a CAL framework to support "fast path" processing. This step may include initializing the CALDPAADriver 212, which in turn would (a) create various DPAA resources needed to process user-plane data (e.g., buffer pools, FQs (or frame queues) and (b) create CAL infrastructure needed to support buffer management and messaging services via DPAA (e.g., internal tables that maintain buffer pool configuration, FQs, and association between ingress FQs and DL Scheduler IP addresses, etc.). The CALInit module 202 also loads LTE FMC's (static) PCD rules and network configurations.

It is known that in a wireless multiple-access communication system, transmitters and receivers may communicate using a multiple layer communication stack. The layers may include, for example, a physical layer, a medium access control (MAC) layer, a radio link control (RLC) layer, a protocol layer (e.g., packet data convergence protocol (PDCP) layer), an application layer and so on. The RLC layer receives service data units (SDU) from the PDCP layer, and concatenates or segments the SDUs into RLC protocol data units (PDU) for transmission to the MAC layer.

Accordingly, the CALBuf module 204 facilitates lock-less buffer management services for L2 applications for use in the RLC SDU processing. As known in the art, a non-blocking algorithm ensures that threads competing for a shared resource do not have their execution indefinitely postponed by mutual exclusion. A non-blocking algorithm is lock-less (or lock-free) if there is guaranteed system-wide progress. The CALBuf module 204 also supports querying for buffer pool statistic data (e.g., pool depletion state, depletion count, pool availability state, pool allocation error count, etc). The CALBuf module 204 interfaces with the CALDPAADriver 212 to implement the services. The CALBuf module 204 provides a lock-less buffer management scheme that is extremely critical for proper system operation in a multi-core environment, where a lock taken by a non-real time process may cause latency issues for a real time process waiting for the release of that lock.

The CALDPAADriver 212 is the kernel space component of the CAL 201 and helps implement and provide buffer management services and messaging services using BMAN and OMAN APIs. As used herein, the term API (or application programming interface) refers to an interface implemented by a software program, which enables it to interact with other software. It facilitates interaction between different software programs similar to the way the user interface facilitates interaction between users and computers. An API is implemented by applications, libraries, and operating systems to determine their vocabularies and calling conventions, and is used to access their services. It may include specifications for routines, data structures, object classes, and protocols used to communicate between the consumer and the implementer of the API.

The CALDPAADriver 212 is responsible for managing DPAA resources (buffer pools and frame queues) to be used for user-plane data distributing; providing user space interface to other CAL modules via various file operations such as open, release, i-o-control (ioctl) for initialization, buffer management, and messaging services; performing kernel-to-userspace (K-U) buffer mapping; providing DPAA buffer pool and receiver and transmitter statistical data; and implementing services for managing ring buffers. It should be noted that ring buffers represent the CAL's L2 software queue, and they are generally used to store FDs destined for a specific L2 DLT. The CALMsg module 206 provides APIs for L2 to retrieve buffer descriptors from a ring.

All of the CAL components described above are generally platform middleware (running in user space), with the exception of the CALDPAADriver 212. The CALDPAADriver 212 is a custom driver that runs in kernel space, and it is designed to implement and provide services needed by the CAL user space middleware—in particular those services that depend on the P4080 DPAA hardware components.

The CALBuf module 204 provides buffer management services to be used exclusively for "fast path" data processing. The CALBuf module 204 provides user space APIs to L2 application. The CALBuf module 204 collaborates with the CALDpaaDriver 212 to provide zero copy and lock-less buffer management service for buffers that the CALDpaa driver 212 creates but are managed by the BMAN 226.

The CALMsg module 206 provides services to receive (ingress) RLC SDUs and send (egress) RLC SDUs via DPAA. The CALMsg module 206 also supports query for Tx/Rx Ethernet interface statistic data (e.g., number of FDs received or transmitted, number of FDs dropped, various types of bad FDs, etc). The CALMsg module 206 interfaces with the CALDPAADriver 212 to implement the services. The CALMsg module 206 provides a zero-copy lock less messaging service to the LTE L2 application to send or receive TCP/UDP IP packets without the use of the protocol stack. This ensures that the application software does not encounter un-bounded latency spikes that may break down the proper system behavior of the LTE system, which has very strict real time processing requirements.

The CALMsg module 206 provides messaging services to L2 software to send and receive user-plane data to or from another board (i.e., eCCM). The CALMsg module 206 generally interfaces with the CALDPAADriver 212 to provide lock-less zero copy messaging services via DPAA. This feature allows the L2 application software to send and receive TCP/UDP IP packets without the use of a protocol stack to avoid un-bounded latency delays.

The CALMsg module 206 implements and provides APIs that support various services, such as the ones described in the following paragraphs.

One possible service is registration of (L2) application entities with the CALMsg service whereby an entity can receive incoming packets via "fast path." During this registration process, a CAL's L2 software queue (i.e., a ring of buffer descriptors, or in other words, a circular buffer for buffer descriptors) is created to maintain received buffer descriptors destined for the entity. Also during this registration, the CALMsg module 206 creates an association between the ingress FQ to the IP address and ring of buffer descriptor IDs for later reference in other processing (e.g., determining which ring of buffer descriptors to push a buffer descriptor to when a frame arrives on a FQ). The CALMsg module 206 also performs kernel to user-space mapping of relevant rings of buffer descriptors, and configures PCD rule for the application entity (if not yet done via static rules). Further, at the beginning of registration process, the CAL 201 implements a defense strategy for ensuring that all buffers acquired by application are properly released when a thread crashes.

A second service provided by the CALMsg module 206 is retrieving a frame destined for the application entity. The returned buffer address points to the start of the payload starting with the Ethernet header.

A third service provided by the CALMsg module 206 is sending a message to an external entity via DPAA on the Ethernet interface configured for processing User plane data (e.g., eth0). It is expected that L2 populates all headers (Ethernet, IP, UDP) needed; and the hardware is properly configured to generate and populate an IP checksum and a UDP checksum.

A fourth service is querying for receiver and transmitter port statistical data.

A fifth service is deregistering an application entity from the CALMsg module 206. Once an application entity is deregistered, it will no longer be able to receive packets via the "fast path." As part of the deregistration process, CAL will release all buffers acquired by the application software. For the case where the CALMsg module 206 is used to receive frames via fast path, the associated ring of buffer descriptors and PCD rule will also be removed.

Figure 3:
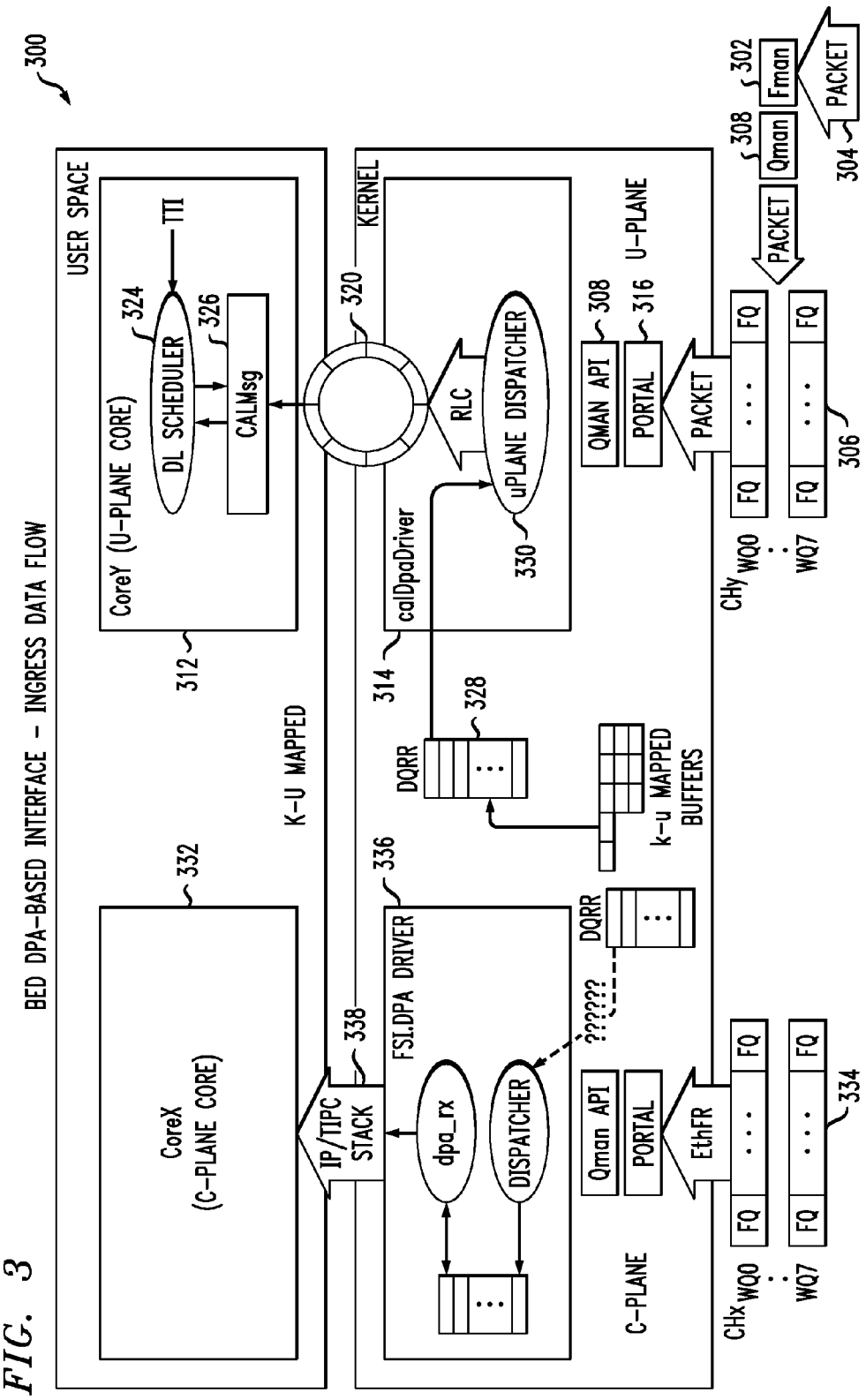
FIG. 3 illustrates an exemplary BED DPAA-based system for providing ingress data flow of data packets.

With reference to FIG. 3, a high-level overview of an exemplary Backplane Ethernet Driver (BED) DPA-based system 300 adapted to provide for ingress data flow of data packets is shown. The left side of FIG. 3 illustrates the path taken by packets destined to go to the control plane core X using a traditional protocol stack. The right hand side of the diagram illustrates the packet traversal for the data plane core Y where the LTE L2 Scheduler is running.

For purposes of illustration, the LTE L2 scheduler consists of two real time threads. The two threads include a DL Scheduler shown as DL SCHEDULER 324 in FIG. 3 that comes into action for ingress packets flow, and an uplink scheduler shown as UL SCHEDULER which comes into action for egress packet flow.

From a hardware perspective each core has a software portal 316. Each portal has a specified number of channels. Each channel has eight priority based work-queues (WQ) that comprise of plurality of Frame queues (FQ).

At a high level, when the FMAN 302 receives a data packet 304, it acquires a suitable size Kernel-User space mapped buffer from BMAN 226, and copies the received packet into the buffer, the FMAN 302 determines (as per the PCD rules) which ingress FQ 306 to en-queue the packet, and uses the OMAN API 308 to en-queue the data packet 304 onto the appropriate FQ 306. When the data packet 304 makes its way up to the hardware register DQRR 328, a portal interrupt is generated for the specified core (such as Core Y 312). In other words, the QMAN handles all the FQs for the various channels. The WQs are there to implement quality of service (QoS). So each arriving packet once en-queued onto a FQ goes through internal hardware queuing within the QMAN. The FQs that make it to the front of the queue, and are ready for processing are put into the DQRR register by the QMAN. The DQRR register has a depth of 15 entries. As each entry (which is a frame queue descriptor that contains info about the FQ, such as the pointer to the packet buffer, an associated callback function, etc), is serviced by the registered callback function 330 in the Interrupt service routine (ISR), the QMAN 308 automatically en-queues the next FQ descriptor onto the DQRR.

The registered callback function "UplaneDispatcher" 330 which is a part of the CAL DPA Driver 314 for the FQ 306 then runs in the kernel space and performs appropriate packet processing. The ring of buffer descriptors 320 for each instance of DL Scheduler has a Ring ID. The ring of buffer descriptor 320 is also kernel to user space (K-U) mapped to allow the user space (such as CALMSG 326), and kernel space (such as CAL DPA Driver 314) components of CAL 128 to access it without any addressing problems, and the need for data copy. During cell initialization the CALMSG 326 provides a service to the user application DL Scheduler 324 to register itself with CALMSG 326. At that time a mapping association between the ingress FQ 306, and the ring ID 320 was also created. The callback function 330 determines which ring ID 320 this particular frame queue descriptor belongs to, and creates a buffer descriptor by copying the kernel-user space mapped buffer pointer (along with any book-keeping info) and en-queuing the buffer descriptor on to the appropriate kernel-user space mapped ring of buffer descriptors 320 for later processing by the associated user space DL scheduler thread 324 on a particular data plane core Y 312.

The DL Scheduler process 324 runs in an endless "Run to Completion" mode in user space. The real time thread wakes up every Delta T time, and invokes the CALMSG 326 API to inquire, if there are packets en-queued for its consumption on the ring of buffer descriptors 320. If there are, the DL Scheduler 326 processes (or consumes) the packets on the ring 320. Since the received packet has not gone through the standard protocol stack, it contains the entire packet header (TCP/UDP/IP/Ethernet). The DL Scheduler 324 ignores the packet header, and operates on the packet payload. When done, it releases the buffer using the CALBUF 204 APIs. Once there are no more packets for the DL scheduler 324 to process, the DL scheduler thread 324 goes back to sleep. Since there is only one producer (CAL DPADriver 314), and one consumer (a specific DL Scheduler thread 324) for each ring of buffer descriptors 320, this scheme may be implemented with atomic operations that do not require any software locks. A further advantage is achieved by using buffers mapped from kernel to user space together with a ring of buffer descriptors such as the ring of buffer descriptors 320. The use of kernel to user-space mapped buffers obviates any need for data copy because the packet will traverse from the kernel-space device drivers to its eventual destination in user space.

In the exemplary embodiment, the control plane traffic and data plane traffic are isolated from each other and are directed to separate Ethernet interfaces. A FMAN 302 may support multiple Ethernet interfaces. The Linux protocol stack is bound to and runs on the control plane core X 332. The CAL PCD module sets up static PCD rules that allows the FMAN 302 to en-queue all packets 304 arriving on the control plane ethernet interface to a Frame Queue (FQ) 334 that will be handled by the FSL DPA driver 336 that runs in Kernel space. This driver 336 hands over the packets to the Linux protocol stack 338. A data copy is also involved as the packet crosses the kernel space to user space boundary. This is shown on the left side of FIG. 3.

Figure 4:
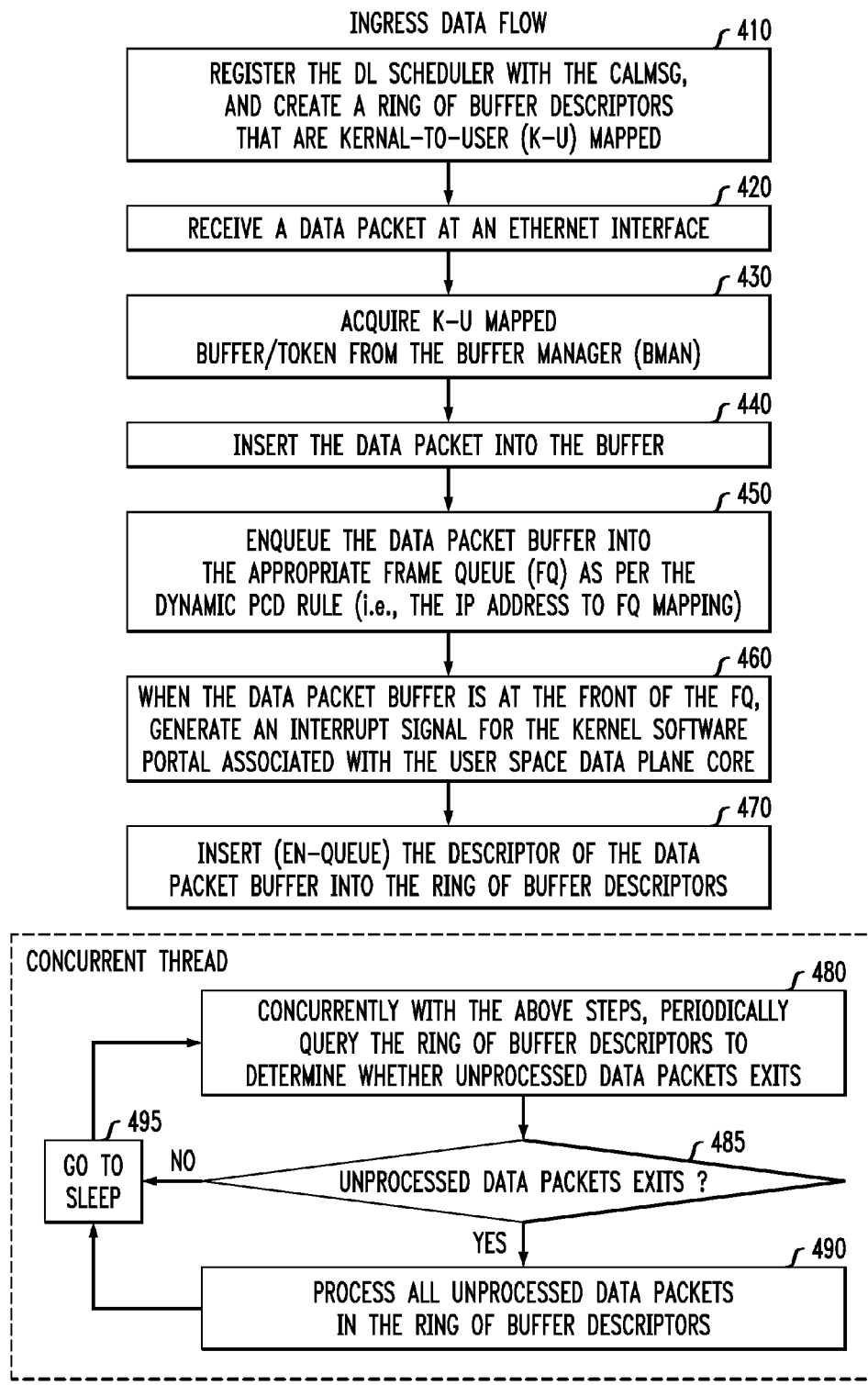
FIG. 4 represents a high-level description of the process flow with respect o an incoming data packet.

A high-level view of the process flow with respect to an incoming data packet for a data plane core is illustrated in FIG. 4. The method of FIG. 4 may be implemented by the apparatus illustrated in FIG. 3.

At step 410, a DL Scheduler 320 registers itself with the CALMSG 326. The system also creates a ring of buffer descriptors 320 that are kernel-to-user-space (K-U) mapped to allow both the kernel space entity (such as the CALDPADriver 314), and the user space entity (such as the CALMSG 326) to access the ring. This step may be performed by the CALMSG 326 in conjunction with the CALDPADriver module 314 for each configured cell on the modem board. Accordingly, if there are three cells supported on a modem board, then there are three separate rings of buffer descriptors 320 (one for each cell), and the CALDPADriver 314 will have a mapping between the ingress FQ 306 to a specific ring of buffer descriptors 320. In the exemplary embodiment, there is one ring of buffer descriptors 320 for each DL SCHEDULER instance 324. The ring of buffer descriptors has a read pointer and a write pointer. Since there is only one producer (such as, for example, the uplaneDispatcher 330 of CALDPAADriver 314 in Kernel space), and one consumer (such as the specific DL Scheduler 324 in user space), the ring of buffer descriptors 320 is implemented in a lock-less fashion using atomic operation.

At step 420, the dedicated data plane Ethernet interface receives a data packet 304.

At step 430, the FMAN 302 acquires a kernel-to-user spaced mapped buffer/token from the BMAN (FIG. 2, 226).

At step 440, the FMAN 302 inserts the received data packet 304 into the acquired buffer.

At step 450, per the dynamic PCD rules setup by the CAL module (CALMSG 206) during cell initialization (providing a mapping between an IP address and an ingress FQ 306), the FMAN 302, with help from QMAN 308, en-queues the packet onto the appropriate FQ 306.

At step 460, when the packet makes it way onto the hardware DQRR register 328, the system, via a P4080 multi-core processor, generates an interrupt for the software portal 316 for Core Y 312 (the data plane core). The callback function that is registered for the specified FQ (in this case the uplaneDispatcher 330) will run as the ISR routine in kernel space to process the packet. In essence, the callback function creates a buffer descriptor from the information contained in the Frame Queue Descriptor (FD) of the DQRR entry being processed. The buffer pointer from the FD is copied into the buffer descriptor, along with some additional book-keeping info.

At step 470, the CALDPAA driver 314 en-queues the generated buffer descriptor from step 460 into the ring of buffer descriptors 320 associated with core Y 312.

Steps 410 through 470 are performed by hardware (FMAN, and QMAN) in conjunction with the kernel thread of CALDPAADriver 314 (e.g., the uplaneDispatcher 330). In the exemplary embodiment, steps 480 through 495 are performed in a process or thread independent from the process(es) or thread(s) that performed steps 410 to 470. In this manner, steps 480-495 are performed by user space threads such as the DL Scheduler 324 on the data plane core Y 312.

Contemporaneous with steps 410 through 470, the DL Scheduler 324 runs in end-less run to completion mode, and wakes up at a TTI (Time-To-Interrupt) interval. At step 480, once awake, the DL Scheduler 324 invokes a CALMSG API 326 to query whether there are any unprocessed packets on the ring of buffer descriptors 320 for consumption. If there are no unprocessed data packets on the ring of buffer descriptors 320, the DL SCHEDULER 324 will receive a non-blocking response from CALMSG module 326 which indicates no unprocessed packets. The DL Scheduler thread 324 then sleeps until the next TTI.

At step 485, if the DL Scheduler 324 determines that there are unprocessed data packets, then the method proceeds to step 490, else the method proceeds to 495.

At step 490, the DL Scheduler 324 processes the next data packet on the ring of buffer descriptors 320. The next packet is indicated by the read pointer of the ring. After the data packet is processed, the DL Scheduler 324 releases the K-U mapped buffer using the CALBUF 204 APIs. In the exemplary embodiment, the data packet to be processed contains both of one or more headers and a payload. The DL Scheduler 324 ignores the header and operates on the payload. The header is used to route the packet to its destination, which is achieved in the exemplary embodiment without the use of a protocol stack. Once DL SCHEDULER 324 processes all packets, the method proceeds to step 495 where the DL SCHEDULER sleeps.

The exemplary embodiment supports three cells (scalable up to six cells). Each cell will have its own DL Scheduler (DL SCHEDULER thread 324) that is bound to and run on its own dedicated data plane core. Accordingly, in the exemplary embodiment, there is a minimum of three DL SCHEDULER (FIGS. 1, 116, 118, and 120) threads running on three different data plane cores. Similarly each cell needs a UL L2 scheduler (UL SCHEDULER). Thus, there are three UL SCHEDULER threads (FIGS. 1, 110, 112, and 114) running on three different data plane cores.

During cell setup, the dynamic PDC rules (i.e., the mapping of IP addresses to ingress FQs) are set up by the CALMSG module 326. The CALMSG module 326 may also perform bookkeeping functions, such as mapping ingress FQs to ring of buffer descriptors IDs. The PCD rules enable the FMAN to examine the IP address of each packet, and determine in which FQ to en-queue the packet. Additional book-keeping information (such as the ingress FQ 306 to ring of buffer descriptors 320 ID mapping) allows the uplaneDispatcher kernel thread 330 to decide in which ring of buffer descriptors 320 it should put a given buffer descriptor associated with an incoming data packet. Thus a lock-less, and zero copy messaging scheme is achieved that allows the ingress packets to reach a DL scheduler thread 324 running on the data plane core Y 312 without the use of a conventional protocol stack.

Figure 5:
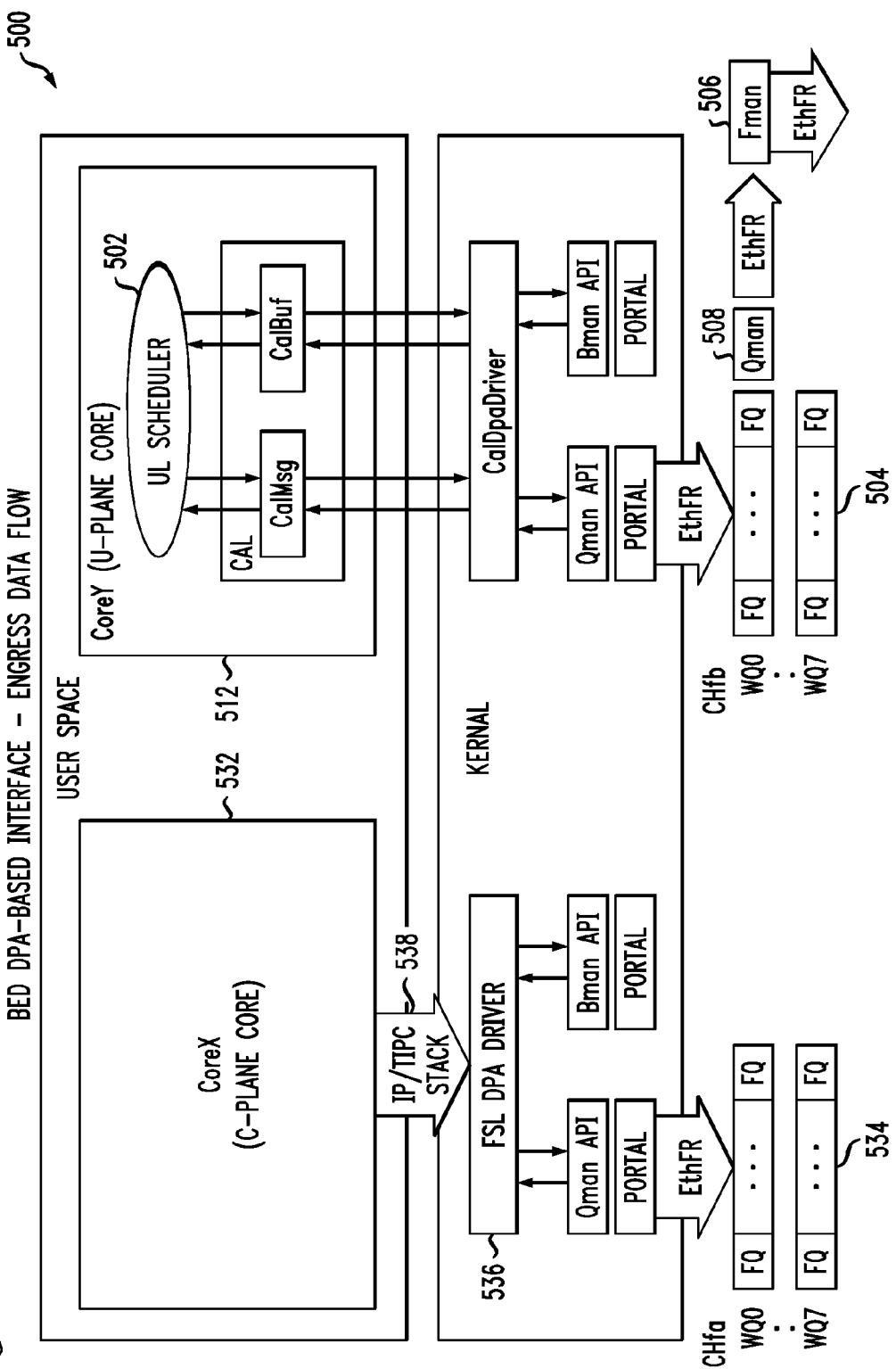
FIG. 5 illustrates an exemplary BED DPAA-based system o providing egress data flow of data packets.

With reference to FIG. 5, a high-level overview of an exemplary Backplane Ethernet Driver (BED) DPA-based system 500 adapted to provide for egress data flow of data packets is shown. The exemplary embodiment 500 provides a solution that does not use the Linux protocol stack to transmit the egress data plane traffic. The left side of FIG. 5 illustrates the path taken by packets sent from the control plane core X 532 using a traditional protocol stack 538. The non real time user space application such as OAM&M 124 running on control plane core x 532 sends TCP/UDP IP packets using the protocol stack 538. The protocol stack 538 forwards the packet to the FSL DPA driver 536 in kernel space. The process of forwarding the packet from the core x 532 in user space to the FSL DPA driver 536 in kernel space requires a data copy. The FSL DPA driver 536 en-queues the packet on a FQ 534 that is eventually serviced by FMAN 506 with help from QMAN 508, and the packet is transmitted on the Ethernet interface. The right hand side of the diagram illustrates the packet traversal for packets originating at the data plane core Y 512 where the LTE L2 UL Scheduler 502 is running without the use of the protocol stack 538. Thus the egress data flow also uses a lock-less zero copy messaging scheme that does not incur un-bounded latency spikes.

Figure 6:
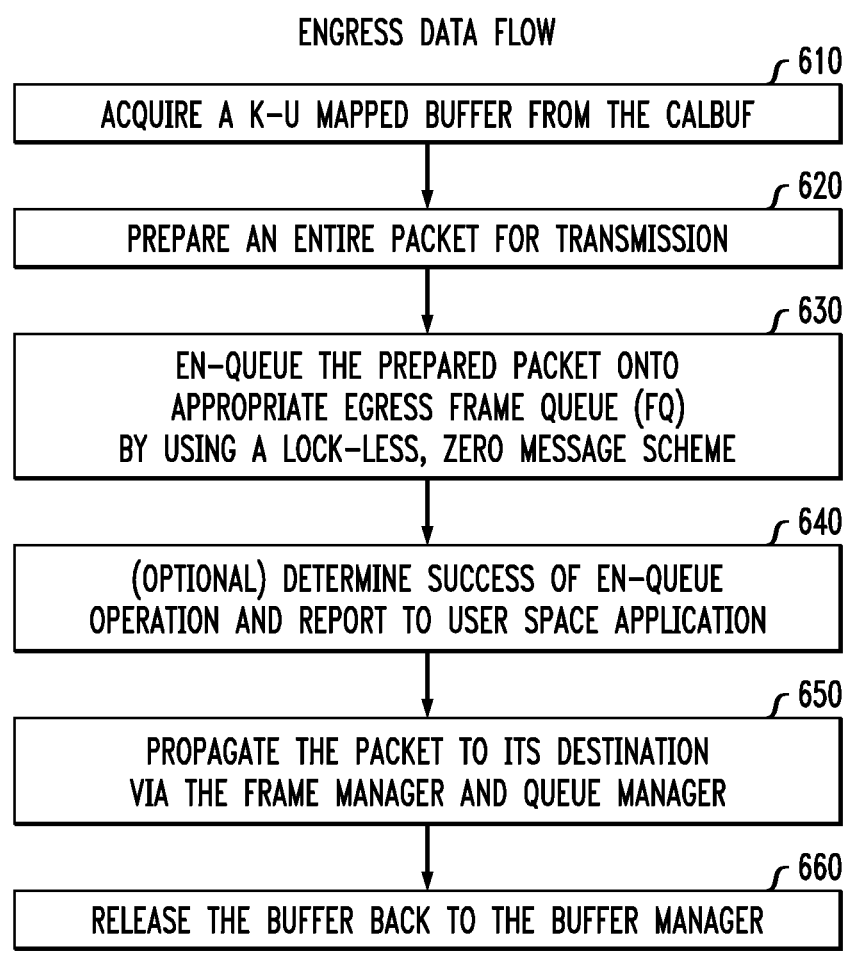
FIG. 6 represents a high-level description of he process flow with respect to an outgoing (egress) data packet.

A high-level view of the process flow with respect to an outgoing data packet (i.e., egress data flow for the data plane core) is illustrated in FIG. 6. The method of FIG. 6 may be implemented by the apparatus illustrated in FIG. 5.

At step 610, the UL scheduler 502 acquires kernel to user space mapped buffers from the CALBUF 522.

At step 620, when the UL scheduler 502 is ready to transmit a TCP/UDP IP packet, the UL scheduler 502 prepares the entire packet (with header, and payload), and then invokes the CALMSG API 522.

At step 630, the CALMSG 522, with help from the CALDPAADriver 524, en-queues the prepared packet onto the appropriate egress FQ 504 of the channel CH B associated with the data plane ethernet interface. This enqueing is performed without the use of the protocol stack and instead relies on a lock-less, zero messaging scheme to avoid unbounded latency spikes.

At optional step 640, the QMAN 508 determines a status of whether the en-queue operation was successful or not, and this response is sent all the way back to the user application UL Scheduler 502 if it so desires to receive the status.

At step 650, the FMAN 506, with help from QMAN 508, processes all packets from the various FQ 504. Even though there is a context switch involved whenever the packet is traversing the user-space to kernel space boundary, there is no data copy involved. Thus, the processing of the packets by the FMAN 506 is performed in a hardware efficient manner so that each individual core has negligible or no performance penalty. Each UL Scheduler 302 has a dedicated FQ 504 on the target channel (CH B 526) to transmit the packets onto the Ethernet interface. There is also one producer (a specific UL SCHEDULER thread 502 instance in user space), and one dedicated egress FQ 504 that is consumed by the FMAN 506 in hardware.

At step 660, once the packet is transmitted, the FMAN 506 releases the buffer back to BMAN (FIG. 2, 226).

A person of skill in the art would readily recognize that steps of various above-described methods can be performed by programmed computers. Herein, some embodiments are also intended to cover program storage devices, for example, digital data storage media, which are machine or computer readable and encode machine-executable or computer-executable programs of instructions, wherein said instructions perform some or all of the steps of said above-described methods. The program storage devices may be, for example, digital memories, magnetic storage media such as a magnetic disks and magnetic tapes, hard drives, or optically readable digital data storage media. The embodiments are also intended to cover computers programmed to perform said steps of the above-described methods.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A computer-implemented method, comprising:
   for at least one processing core of a multi-core processor comprising kernel space and user space:
   acquiring a kernel to user-space (K-U) mapped buffer and a corresponding K-U mapped buffer pointer;
   inserting a data packet into the buffer;
   creating a frame descriptor containing the K-U mapped buffer pointer;
   inserting the frame descriptor onto a frame queue specified by a dynamic parsing, classification, and distribution (PCD) rule mapping IP addresses to frame queues;
   creating a K-U mapped buffer descriptor from the frame descriptor; and
   inserting the K-U mapped buffer descriptor into a circular buffer.

2. The method of claim 1, wherein the circular buffer is adapted to store K-U mapped buffer descriptors.

3. The method of claim 1, wherein the data packet is received via an ethernet interface.

4. The method of claim 1, wherein the data packet is a transmission control protocol (TCP) or a user datagram protocol (UDP) packet.

5. The method of claim 4,
   wherein the circular buffer is a ring of K-U mapped buffer descriptors that allows a process running in user-space to have lock-less, zero copy access to buffers created or processed by a process running in the kernel; and
   wherein the circular buffer allows the process running in user-space to process the data packet without the use of a protocol stack.

6. The method of claim 5, wherein the process running in the kernel is
   part of a real-time operating system.

7. The method of claim 1, further comprising:
   en-queuing the received data packet into a frame queue for processing.

8. The method of claim 7, wherein the frame queue is implemented in hardware, and further comprising:

after the data packet reaches the front of the hardware frame queue, generating an interrupt for the corresponding processing core; and executing a callback function associated with the interrupt in kernel space that en-queues the data packet into the circular buffer for processing.

9. The method of claim 1, wherein the circular buffer itself comprises memory that is K-U mapped.

10. The method of claim 1, wherein the circular buffer is a ring of K-U mapped buffer descriptors that allows a thread running in user-space to have lock-less, zero copy access to buffers created or processed by a thread running in the kernel.

11. The method of claim 10, wherein the thread running in the kernel is part of a real-time operating system.

12. The method of claim 1, wherein the acquisition of a K-U mapped buffer, insertion of the data packet into the buffer, and the insertion of the buffer descriptor into the circular buffer are performed by one or more kernel threads in conjunction with hardware components, and further comprising:

running a user space thread that wakes up at periodic intervals;

wherein the user space thread, upon waking, queries the circular buffer to determine whether any unprocessed buffer descriptors exist in the circular buffer; and upon determining that an unprocessed buffer descriptor exists in the circular buffer, processing the data packet within the buffer using the same or a different user space thread.

13. The method of claim 12, wherein the processing of the data packet within the buffer ignores the packet header and operates solely on the packet payload.

14. The method of claim 12, further comprising:
acquiring a second K-U mapped buffer;
constructing a transmission control protocol (TCP) or user datagram protocol (UDP) data packet with a header and payload responsive to the processing of the data packet;
enqueuing the constructed data packet onto a frame queue; and
transmitting the data packet via an ethernet interface.

15. The method of claim 14, further comprising:
determining a status of the enqueuing operation and reporting the status to an application on the user space thread.

16. The method of claim 14, wherein a protocol stack is not employed.

17. An apparatus for providing lock-less, zero copy access to buffers between user-space processes and kernel space processes, comprising:
a modem board;
a multi-core processor comprising a plurality of processor cores attached to the modem board, wherein the modem board comprises kernel space and user space; and
a circular buffer for a processor core adapted to store kernel space to user space (K-U) mapped buffer descriptors;
a user space thread configured to wake up at a periodic interval, wherein, upon waking, the user space thread is further configured to:
query the circular buffer to determine whether one or more unprocessed buffer descriptors exist in the circular buffer; and
upon determining that an unprocessed buffer descriptor exists in the circular buffer, process the data packet within the buffer using the same or a different user space thread.

18. The apparatus of claim 17,
wherein the kernel space is reserved for running the kernel, kernel extension and device drivers; and
wherein the user space is the memory area where user mode applications are executed.

19. The apparatus of claim 17, further comprising:
an ethernet interface configured to receive data packets;
a buffer manager configured to acquire a kernel space to user space (K-U) mapped buffer and corresponding buffer descriptor; and
a frame manager configured to:
insert a received data packet into the K-U mapped buffer, and
en-queue the corresponding buffer descriptor into the circular buffer.

20. The apparatus of claim 19, wherein the data packets are transmission control protocol (TCP) or user datagram protocol (UDP), packets.

21. The apparatus of claim 19, wherein the buffer manager driver and frame manager driver are in kernel space.

22. A non-transitory computer-usable data carrier storing instructions that, when executed by a computer, cause the computer to, for plurality of processing cores:
acquire a circular buffer for storing buffer descriptors, wherein the buffer descriptors contain information about buffers that are kernel space to user space (K-U) mapped; and
perform the following using one or more kernel space threads in conjunction with one or more hardware components:
receive a data packet at an ethernet interface;
acquire a K-U mapped buffer and corresponding pointer;
insert the received data packet into the K-U mapped buffer;
en-queue a frame descriptor comprising of the K-U mapped buffer pointer containing the data packet into a frame queue; and
after the data packet arrives at the front of the frame queue, generate an interrupt signal invoking a process that creates a buffer descriptor from the frame descriptor, and inserts the buffer descriptor associated with the data packet into the specified circular buffer as per a frame queue to circular buffer mapping.

23. The non-transitory computer-usable data carrier of claim 22, further comprising instructions to perform the following using a user space thread adapted to wake up at a predetermined interval:
upon waking, query the circular buffer to determine whether any unprocessed buffer descriptors exist in the circular buffer; and
upon determining that an unprocessed buffer descriptor exists in the circular buffer, process the data packet within the buffer using the same or a different user space thread.

24. The non-transitory computer-usable data carrier of claim 22, wherein the acquired circular buffer is a ring of K-U mapped buffer descriptors that causes a process running in user-space to have lock-less, zero copy access to buffers created or processed by a process running in the kernel.

* * * * *